United States Patent
Jakóbczyk et al.

(10) Patent No.: US 12,532,922 B2
(45) Date of Patent: *Jan. 27, 2026

(54) AEROSOL PROVISION DEVICE

(71) Applicant: eSmoking Institute Sp. z o.o., Poznan (PL)

(72) Inventors: Adrian Jakóbczyk, Poznan (PL); Lukasz Milewski, Poznan (PL); Marcin Kozlowski, Poznan (PL); Marcin Kos, Poznan (PL); Andrzej Szykowny, Poznan (PL); Krzysztof Szeinig, Poznan (PL); Maciej Maciagowski, Poznan (PL); Pawel Zielazek, Poznan (PL)

(73) Assignee: eSmoking Institute Sp. z o.o., Poznan (PL)

( * ) Notice: Subject to any disclaimer, the term of this patent is extended or adjusted under 35 U.S.C. 154(b) by 415 days.

This patent is subject to a terminal disclaimer.

(21) Appl. No.: 18/001,391

(22) PCT Filed: Jun. 9, 2021

(86) PCT No.: PCT/EP2021/065435
§ 371 (c)(1),
(2) Date: Dec. 9, 2022

(87) PCT Pub. No.: WO2021/250084
PCT Pub. Date: Dec. 16, 2021

(65) Prior Publication Data
US 2023/0218012 A1    Jul. 13, 2023

(30) Foreign Application Priority Data
Jun. 10, 2020   (PL) .................................. 434275

(51) Int. Cl.
*A24F 40/90* (2020.01)
*A24F 40/20* (2020.01)
(Continued)

(52) U.S. Cl.
CPC ............. *A24F 40/90* (2020.01); *A24F 40/20* (2020.01); *A24F 40/50* (2020.01); *A24F 40/60* (2020.01);
(Continued)

(58) Field of Classification Search
CPC ...................................................... A24F 40/90
(Continued)

(56) References Cited

U.S. PATENT DOCUMENTS 10,136,674 B2 * 11/2018 Murison ................ A24F 15/015
10,588,176 B2 *  3/2020 Marsh .................... A24F 40/46
(Continued)

FOREIGN PATENT DOCUMENTS

EP    2701268 A1    2/2014
EP    2725681 A2 *  4/2014  ............. A24F 40/50
(Continued)

OTHER PUBLICATIONS

International Search Report and Written Opinion of corresponding International Application No. PCT/EP2021/065435 mailed Sep. 17, 2021, all pages cited in its entirety.
(Continued)

*Primary Examiner* — Jerry D Robbins
(74) *Attorney, Agent, or Firm* — Burr & Forman

(57) ABSTRACT

An apparatus and a method for an aerosol generating device is described, the apparatus including a charging controller. The charging controller is configured to control charging of
(Continued)

a battery using a power supply at a charging current dependent, at least in part, on power capabilities of the power supply.

7 Claims, 6 Drawing Sheets

(51) Int. Cl.
*A24F 40/50* (2020.01)
*A24F 40/60* (2020.01)
*H02J 7/00* (2006.01)

(52) U.S. Cl.
CPC ...... *H02J 7/00032* (2020.01); *H02J 7/00712* (2020.01); *H02J 2310/22* (2020.01)

(58) Field of Classification Search
USPC .......................................................... 320/114
See application file for complete search history.

(56) References Cited

U.S. PATENT DOCUMENTS

| | | | | |
|---|---|---|---|---|
| 11,085,550 | B2* | 8/2021 | Marsh | H02J 7/0044 |
| 2014/0360512 | A1* | 12/2014 | Xiang | H02J 7/00712 |
| | | | | 131/328 |
| 2015/0043117 | A1* | 2/2015 | Xiang | H02J 7/0031 |
| | | | | 361/91.5 |
| 2015/0189917 | A1* | 7/2015 | Xiang | H02J 7/02 |
| | | | | 131/328 |
| 2015/0333542 | A1* | 11/2015 | Alarcon | H02J 7/007 |
| | | | | 131/328 |
| 2017/0215484 | A1* | 8/2017 | Xiang | H02J 7/007182 |
| 2018/0020732 | A1* | 1/2018 | Kozlowski | H05B 3/265 |
| | | | | 392/404 |
| 2018/0140010 | A1* | 5/2018 | Sur | H05B 1/0244 |
| 2020/0315254 | A1* | 10/2020 | Zielazek | A24F 40/60 |
| 2021/0267283 | A1* | 9/2021 | Kozlowski | A24F 40/90 |

FOREIGN PATENT DOCUMENTS

| | | |
|---|---|---|
| EP | 3007306 A1 | 4/2016 |
| EP | 3838034 A1 | 6/2021 |
| JP | 2013123333 A | 6/2013 |
| JP | 2019062690 A | 4/2019 |
| JP | 2019109898 A | 7/2019 |
| JP | 2020058237 A | 4/2020 |
| WO | 2019150545 A1 | 8/2019 |
| WO | 2020035899 A | 2/2020 |

OTHER PUBLICATIONS

Notice of Reasons for Rejection from corresponding Japanese Application No. 2022-574485 mailed Feb. 6, 2024, all pages cited in its entirety.
Notice to file a response from corresponding KR Application No. KR 10-2022-7043360, mailed Mar. 13, 2025, all pages cited in its entirely.

* cited by examiner

AEROSOL PROVISION DEVICE

CROSS-REFERENCE TO RELATED APPLICATIONS

The present application is a National Phase entry of PCT Application No. PCT/EP2021/065435, filed Jun. 9, 2021, which claims priority from Poland Application No. P.434275, filed Jun. 10, 2020, each of which is hereby fully incorporated herein by reference.

TECHNICAL FIELD

The present specification relates to an aerosol provision device and a method of using such a device.

BACKGROUND

Smoking articles, such as cigarettes, cigars and the like burn tobacco during use to create tobacco smoke. Attempts have been made to provide alternatives to these articles by creating products that release compounds without combusting. For example, tobacco heating devices heat an aerosol generating substrate such as tobacco to form an aerosol by heating, but not burning, the substrate.

SUMMARY

In a first aspect, this specification describes an apparatus for an aerosol generating device, the apparatus comprising a charging controller, wherein the charging controller is configured to control charging of a battery using a power supply at a charging current dependent, at least in part, on power capabilities of the power supply.

The charging controller may be configured to select between at least a first charging mode and a second charging mode. The first charging mode may, for example, be a higher power charging mode and the second charging mode may be a lower power charging mode. A charging rate for charging the battery may be higher in the first charging mode than in the second charging mode.

In some embodiments, the charging controller, or a control module in communication with the charging controller, may be configured to determine the power capabilities of the power supply. For example, the charging controller, or a control module in communication with the charging controller, may be configured to determine the power capabilities of the power supply on the basis of a voltage drop in response to a request for an increased charging current.

Some embodiments further comprise a user interface, wherein the user interface enables a user to provide information, for example information relating to the power capabilities of the power supply.

The apparatus may further comprise a battery. Alternatively, or in addition, the apparatus may further comprise an aerosol generator.

In a second aspect, this specification describes a method comprising: obtaining information regarding power capabilities of a power supply used for charging a battery of an aerosol generating device; and setting a charging current used to charge the battery depending, at least in part, on said power capabilities.

The method may further comprise selecting between at least a first charging mode and a second charging mode. The first charging mode may be a higher power charging mode and the second charging mode may be a lower power charging mode. The charging rate for charging the battery may be higher in the first charging mode than in the second charging mode.

The method may further comprise determining the power capabilities of the power supply. For example, determining the power capabilities of the power supply may comprise: determining a first voltage at which a first current is provided by the power supply; determining a second voltage at which a second current, higher than the first current, is provided by the power supply; determining the difference between the first and second voltages; and determining the power capabilities of the power supply based, at least in part, on the difference between the first and second voltages.

The method may further comprise providing a user interface to enable a user to provide information relating to the power capabilities of the power supply.

The method may further comprise charging said battery.

In a third aspect, this specification describes a non-combustible aerosol generating device comprising an apparatus (e.g. a tobacco heating system) including any of the features of the first aspect. The aerosol generating device may be configured to receive a removable article comprising an aerosol generating material. The aerosol generating material may comprise an aerosol generating substrate and an aerosol forming material.

In a fourth aspect, this specification describes an aerosol provision system for generating aerosol from an aerosolizable material, the aerosol provision system comprising an apparatus including any of the features of the first aspect described above or a device including any of the features of the third aspect described above.

In a fifth aspect, this specification describes computer-readable instructions which, when executed by computing apparatus, cause the computing apparatus to perform any method as described with reference to the second aspect.

In a sixth aspect, this specification describes a kit of parts comprising an article (e.g. a removable article comprising an aerosol generating material) for use in a non-combustible aerosol generating system, wherein the non-combustible aerosol generating system comprises an apparatus including any of the features of the first aspect described above or a device or system including any of the features of the third or fourth aspects described above.

BRIEF DESCRIPTION OF THE DRAWINGS

Example embodiments will now be described, by way of example only, with reference to the following schematic drawings, in which.

DETAILED DESCRIPTION OF THE DRAWINGS

Figure 1:
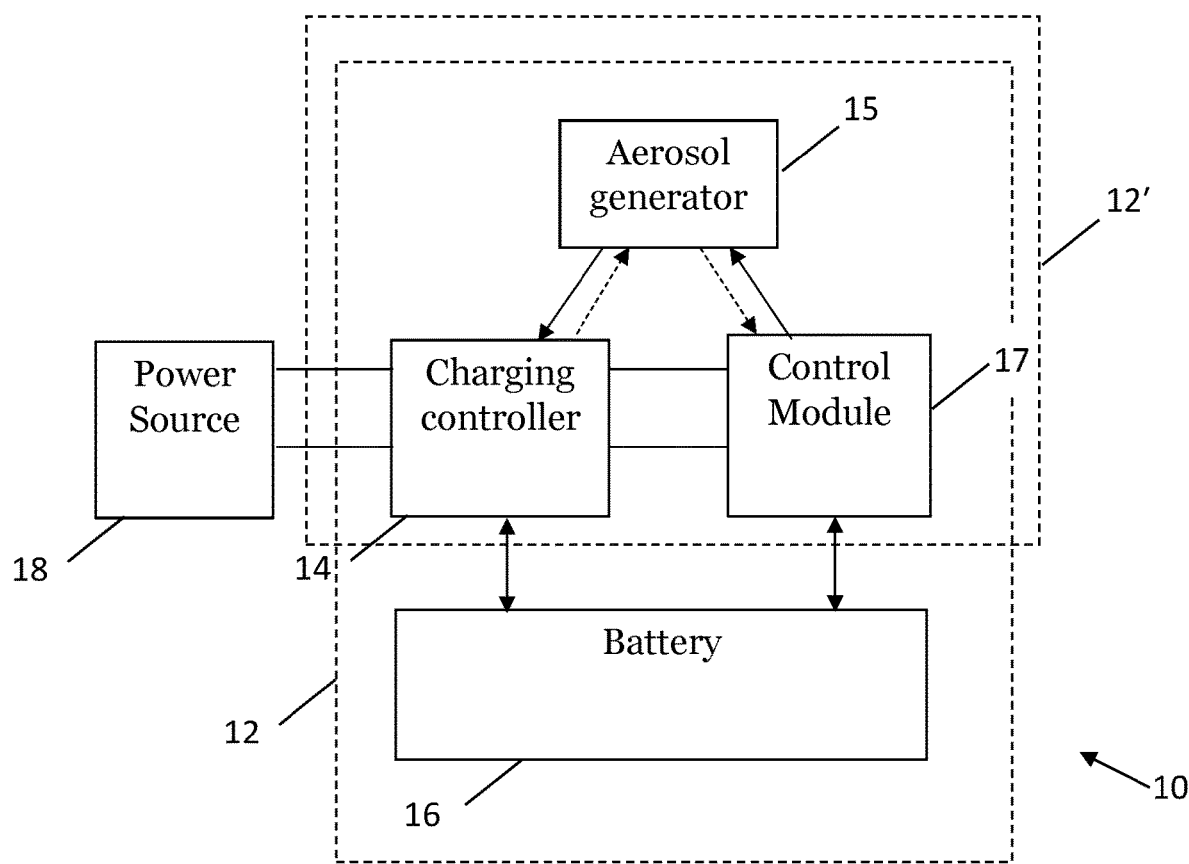
FIG. 1 is a block diagram of a system in accordance with an example embodiment.
Figure 2:
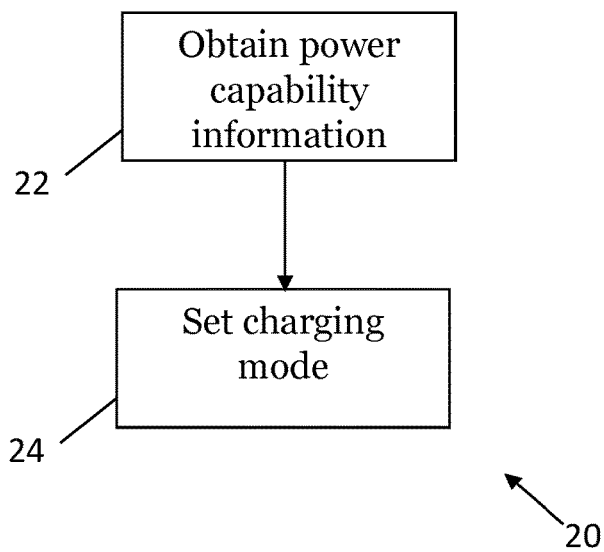
FIG. 2 is a flow chart showing an algorithm in accordance with an example embodiment.
Figure 3:
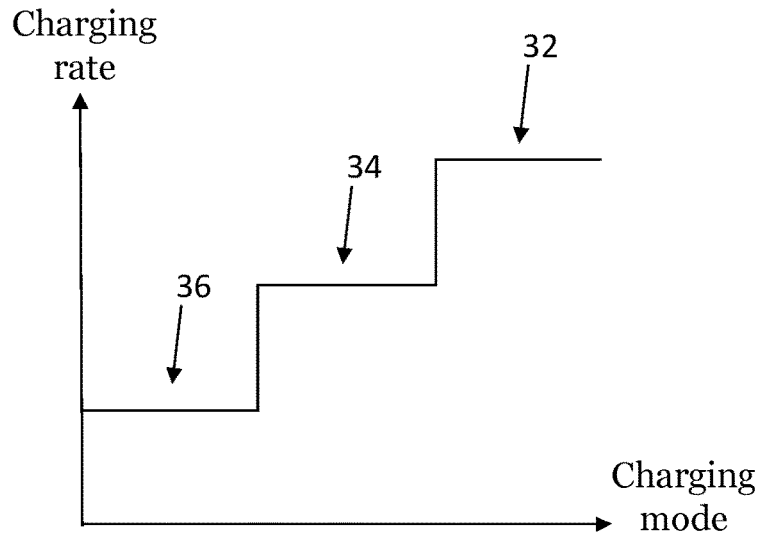
FIG. 3 is a plot demonstrating a use of an example embodiment.
Figure 4:
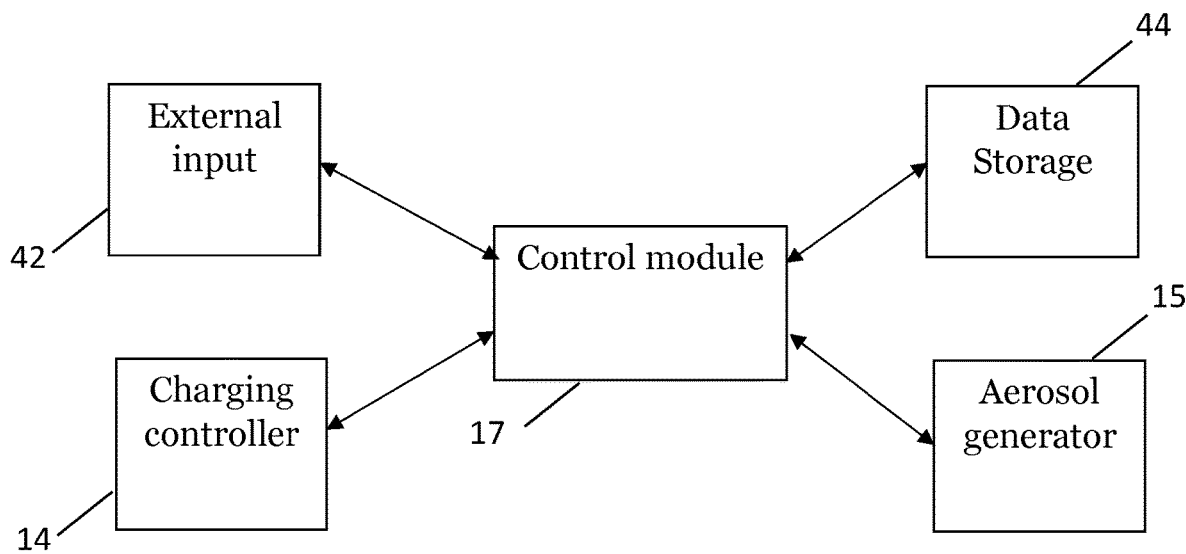
FIG. 4 is a block diagram of a system in accordance with an example embodiment.

As used herein, the term "delivery system" is intended to encompass systems that deliver a substance to a user, and includes:
- combustible aerosol provision systems, such as cigarettes, cigarillos, cigars, and tobacco for pipes or for roll-your-own or for make-your-own cigarettes (whether based on tobacco, tobacco derivatives, expanded tobacco, reconstituted tobacco, tobacco substitutes or other smokable material);
- non-combustible aerosol provision systems that release compounds from an aerosolizable material without combusting the aerosolizable material, such as electronic cigarettes, tobacco heating products, and hybrid systems to generate aerosol using a combination of aerosolizable materials;
- articles comprising aerosolizable material and configured to be used in one of these non-combustible aerosol provision systems; and
- aerosol-free delivery systems, such as lozenges, gums, patches, articles comprising inhalable powders, and smokeless tobacco products such as snus and snuff, which deliver a material to a user without forming an aerosol, wherein the material may or may not comprise nicotine.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

In embodiments described herein, the delivery system is a non-combustible aerosol provision system, such as a powered non-combustible aerosol provision system.

In one embodiment, the non-combustible aerosol provision system is an electronic cigarette, also known as a vaping device or electronic nicotine delivery system (END), although it is noted that the presence of nicotine in the aerosolizable material is not a requirement.

In one embodiment, the non-combustible aerosol provision system is a tobacco heating system, also known as a heat-not-burn system.

In one embodiment, the non-combustible aerosol provision system is a hybrid system to generate aerosol using a combination of aerosolizable materials, one or a plurality of which may be heated. Each of the aerosolizable materials may be, for example, in the form of a solid, liquid or gel and may or may not contain nicotine. In one embodiment, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision system. However, it is envisaged that articles which themselves comprise a means for powering an aerosol generating component may themselves form the non-combustible aerosol provision system.

In one embodiment, the non-combustible aerosol provision device may comprise a power source and a controller. The power source may be an electric power source or an exothermic power source. In one embodiment, the exothermic power source comprises a carbon substrate which may be energized so as to distribute power in the form of heat to an aerosolizable material or heat transfer material in proximity to the exothermic power source. In one embodiment, the power source, such as an exothermic power source, is provided in the article so as to form the non-combustible aerosol provision.

In one embodiment, the article for use with the non-combustible aerosol provision device may comprise an aerosolizable material, an aerosol generating component, an aerosol generating area, a mouthpiece, and/or an area for receiving aerosolizable material.

In one embodiment, the aerosol generating component is a heater capable of interacting with the aerosolizable material so as to release one or more volatiles from the aerosolizable material to form an aerosol. In one embodiment, the aerosol generating component is capable of generating an aerosol from the aerosolizable material without heating. For example, the aerosol generating component may be capable of generating an aerosol from the aerosolizable material without applying heat thereto, for example via one or more of vibrational, mechanical, pressurization, or electrostatic means.

In one embodiment, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception. The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical. In some embodiments, the active substance comprises nicotine. In some embodiments, the active substance comprises caffeine, melatonin or vitamin B12.

The aerosol forming material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more functional materials may comprise one or more of flavors, carriers, pH regulators, stabilizers, and/or antioxidants.

In one embodiment, the article for use with the non-combustible aerosol provision device may comprise aerosolizable material or an area for receiving aerosolizable material. In one embodiment, the article for use with the non-combustible aerosol provision device may comprise a mouthpiece. The area for receiving aerosolizable material may be a storage area for storing aerosolizable material. For example, the storage area may be a reservoir. In one embodiment, the area for receiving aerosolizable material may be separate from, or combined with, an aerosol generating area.

Aerosolizable material, which also may be referred to herein as aerosol generating material, is material that is capable of generating aerosol, for example when heated, irradiated or energized in any other way. Aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous) . In some embodiments, the amorphous solid may be a dried gel. The amorphous solid is a solid material that may retain some fluid, such as liquid, within it.

The aerosolizable material may be present on a substrate. The substrate may, for example, be or comprise paper, card, paperboard, cardboard, reconstituted aerosolizable material, a plastics material, a ceramic material, a composite material, glass, a metal, or a metal alloy.

A consumable is an article comprising or consisting of aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction, or a susceptor.

A susceptor is a material that is heatable by penetration with a varying magnetic field, such as an alternating magnetic field. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor may be both electrically-conductive and magnetic, so that the susceptor is heatable by both heating mechanisms. The device that is configured to generate the varying magnetic field is referred to as a magnetic field generator, herein.

FIG. 1 is a block diagram of a system, indicated generally by the reference numeral 10, in accordance with an example embodiment.

The system 10 comprises a charging controller 14, an aerosol generator 15, a battery 16, a control module 17 and a power source (or power supply) 18. The charging controller 14, the aerosol generator 15, the battery 16 and the control module 17 may form an aerosol generating device 12. Alternatively, the charging controller 14, the aerosol generator 15 and the control module 17 may form an aerosol generating device 12' having an external battery 16.

As discussed in detail below, the charging controller 14 is configured to charge the battery 16 (e.g. under the control of the control module 17). For example, the charging controller 14 may charge the battery using the power supply 18 at a charging current dependent, at least in part, on power capabilities of the power supply (e.g. the power source 18).

It should be noted that, in some embodiments, the functionality of the control module 17 is implemented by the charging controller 14. Indeed, the control module 17 may be omitted from some example embodiments.

FIG. 2 is a flow chart showing an algorithm, indicated generally by the reference numeral 20, in accordance with an example embodiment. The algorithm 20 may be implemented by the system 10 described above.

The algorithm 20 starts at operation 22, where the charging controller 14 (or the control module 17) obtains (or determines) information regarding power capabilities of the power source 18 used for charging the battery 16. The power capabilities may, for example, include one or more of the ability of the power supply to provide a particular charging current, a maximum current and/or a maximum voltage that the power source can provide or a temperature of the power source. Other power capabilities may be relevant in addition to, or instead of, some or all of the power capabilities referred to above.

Then, at operation 24, the charging current used to charge the battery is set depending, at least in part, on said power capabilities.

The operation 24 may be implemented by setting a charging mode to one of a plurality of charging modes. For example, two charging modes could be provided: a first charging mode (e.g. a higher power charging mode) and a second charging mode (e.g. a lower power charging mode). Thus, the charging rate of charging the battery 16 may be higher in the first charging mode than in the second charging mode. There may be more than two charge levels (and hence more than one threshold) in some example embodiments.

As discussed in detail below, the operation 22 may include determining the power capabilities of the power supply. Alternatively, the operation 22 may include obtaining the power capability information from some other source.

FIG. 3 is a plot, indicated generally by the reference numeral 30, demonstrating a use of an example embodiment.

The plot 30 shows the charging rate in different charging modes. In a first charging mode, indicated generally by the reference numeral 32, the charging rate is relatively high (such that the battery 16 is charged at a first, relatively high, charging rate in the first charging mode). In a second charging mode, indicated generally by the reference numeral 34, the charging rate is lower than the charging rate in the first charging mode 32. Finally, in a third charging mode, indicated generally by the reference numeral 36, the charging rate is lower than the charging rate in either the first or second charging modes.

Thus, the plot 30 shows charging rates of three possible charging modes that could be set in the operation 24. Of course, the three charging rates are provided by way of example only; more or fewer charging rates could be provided in an embodiment of the invention (indeed, two charging modes are used in many example embodiments). Moreover, although the plot 30 shows discrete charging rate changes in different charging modes this is not essential to all example embodiments; a more gradual change may be implemented, as discussed further below.

FIG. 4 is a block diagram of a system, indicated generally by the reference numeral 40, in accordance with an example embodiment. The system 40 comprises the charging controller 14, the aerosol generator 15 and the control module 17 described above and further comprise an external input 42 and data storage 44.

The control module 17 may set the charging mode based on a variety of inputs, such as some or all of the inputs shown in the system 40, as discussed further below. Note that, in some embodiments, the functionality of the control module 17 is implemented by the charging controller 14, such that the charging controller 14 is in the center of the system 40.

The external input 42 may be used to provide input to an algorithm used by the control module 17 (or the charging controller 14) for setting the charging mode. For example, the external input may provide information relating to one or more power capabilities of the power supply. As discussed below, the external input 42 may take the form of a user interface that enables a user of an aerosol generating device to provide information relating to one or more power capabilities of the power supply.

The charging controller 14 may be used to provide input to an algorithm used by the control module 17 for setting the charging mode. For example, the charging controller may provide information relating to one or more power capabilities of the power supply. As discussed below, the charging controller 14 may implement an algorithm that determines power supply voltage changes in response to changing charging current demands, which power supply voltage changes may be indicative of power supply capabilities.

The data storage 44 may be used by the control module 17 in an implementation of the algorithm 20. For example, charging rate settings may be stored in the data storage 44. Also, information for converting power capability information into a charging mode may be stored at the data storage 44. Power capability information may itself be stored in using data storage 44.

The aerosol generator 15 may provide information to the control module 17 that may be used in setting the charging mode. For example, the current level of charge of the aerosol generator (e.g. the battery 16) may be provided to the control module 17 by the aerosol generator 15. Further, usage information for the aerosol generator may be provided (which data may be used, in addition to power capabilities information, in setting the charging mode, rate or current).

It is not essential to all example embodiments that all of the elements of the system 40 are provided. As discussed above, the functionality of the control module 17 may, in fact, be provided by the charging controller 14. Further, there may be no communication between the aerosol generator 15 and the control module 17. Similarly, one or more of the external input 42 and the data storage 44 may be omitted if not required.

Figure 5:
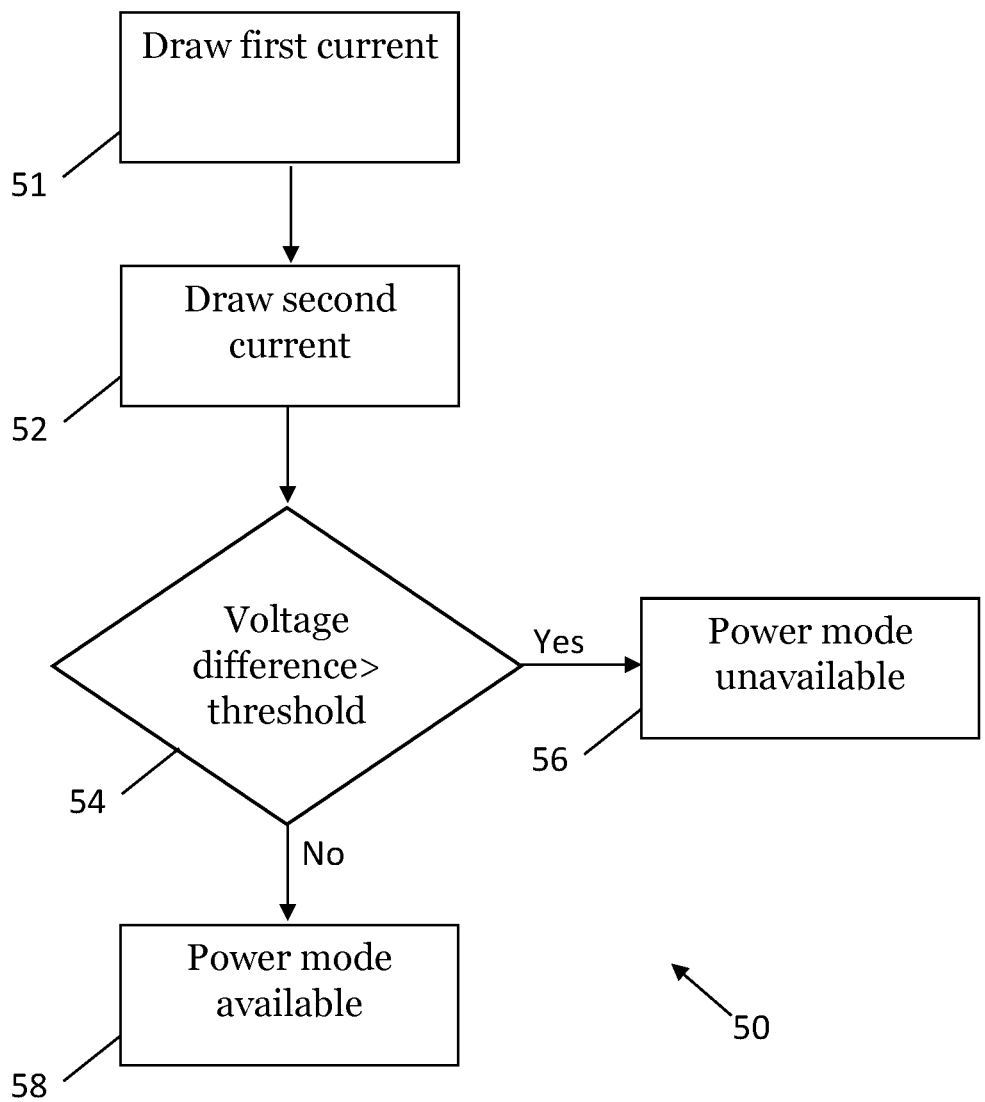
FIG. 5 is a flow chart showing an algorithm in accordance with an example embodiment.

FIG. 5 is a flow chart showing an algorithm, indicated generally by the reference numeral 50, in accordance with an example embodiment. The algorithm 50 may be implemented by the charging controller 14, the control module 17, the external input 42 or elsewhere. Further, the algorithm 50 may be distributed; for example, some steps may be implemented by the charging controller 14 with other steps being implemented by the control module 17.

The algorithm 50 starts at operation 51, where a first current is drawn from the power source 18 (e.g. a power supply). The voltage at which that first current is provided by the power source may be determined or detected (and may, for example, be stored in the data storage 44).

At operation 52, the current demand is changed (typically increased) such that a second current is drawn from the power source 18. The voltage at which the second current is provided by the power source may be determined or detected (and may, for example, be stored in the data storage 44).

At operation 54, the difference between the voltage at which the first and second currents are provided is determined and, if that voltage change is above a threshold, the algorithm 50 moves to operation 56; otherwise, the algorithm 50 moves to operation 58.

At operation 56, the fact that the voltage difference is above the relevant threshold is used to determine that the power capabilities of the power source are insufficient to provide the power mode associated with the higher current (typically the second current). Accordingly, that power mode is set to be unavailable.

At operation 58, the fact that the voltage difference is below the relevant threshold is used to determine that the power capabilities of the power source are sufficient to provide the power mode associated with the higher current (typically the second current). Accordingly, that power mode is set to be available.

The settings as determined in the operations 56 and 58 may be stored in an internal register indicative of power capabilities (e.g. which of the power modes are available for selection). That register may, for example, form part of the data storage 44 described above.

The algorithm 50 may be part of a one-off test procedure or a periodic test procedure such that a determination of power capabilities is performed in order to determine which of a plurality of power modes are available for charging the battery of the aerosol generator. Alternatively, or in addition, the algorithm 50 may be ongoing. For example, the algorithm 50 may be carried out during charging, such that power capabilities of the power source are determined during charging.

Figure 6:
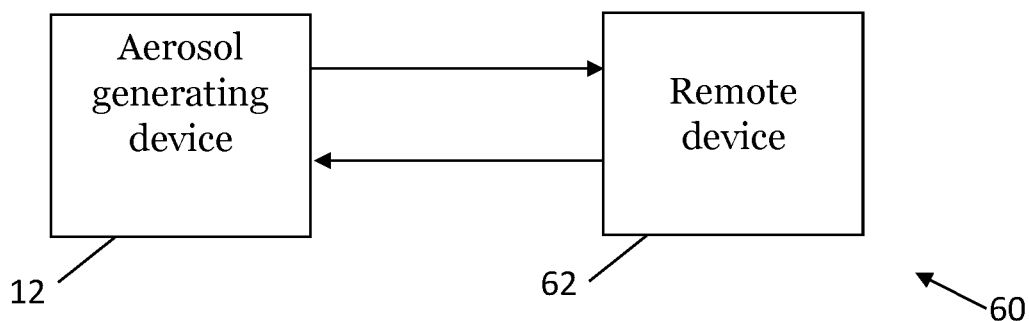
FIG. 6 is a block diagram of a system in accordance with an example embodiment.

FIG. 6 is a block diagram of a system, indicated generally by the reference numeral 60, in accordance with an example embodiment. The system 60 comprises the aerosol generating device 12 (or the device 12') described above and a remote device 62, such as a mobile communication device, mobile phone, laptop, or some other mobile device etc.

As discussed further below, the aerosol generating device 12 has an output that transmits a signal (such as a Bluetooth signal). That signal can be detected by the remote device 62 such that the aerosol generating device can communicate with the remote device. Similarly, the remote device 62 is able to transmit to the aerosol generating device 12. It should be noted that although the configuration shown in FIG. 6 provides two-way communications between the aerosol generating device 12 and the remote device 62, the communication may be one-way (e.g. from the aerosol generating device to the remote device or vice-versa).

The system 60 may enable communications between the remote device 62 and the control module 17 and/or the charging controller 14. For example, the system 60 may enable data regarding the aerosol generating device 12 to be displayed to a user using the remote device 62 (which may have a better and/or more interactive display than the aerosol generating device itself). Similarly, the system 60 may enable the user to provide inputs to the aerosol generating device.

Figure 7:
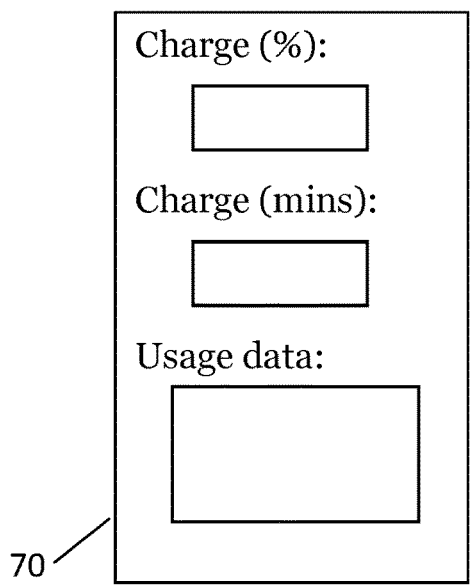
FIGS. 7 and 8 show user interfaces in accordance with example embodiments.

FIG. 7 shows a user interface, indicated generally by the reference numeral 70, in accordance with an example embodiment. The user interface 70 shows an example display in highly schematic form that shows data relating to the aerosol generating device (e.g. as a battery charge level in percentage and time remaining terms) and usage data of the device. Thus, the user interface enables, for example, the charging controller 14 or the control module 17 to provide information to a user of the aerosol generating device.

Figure 8:
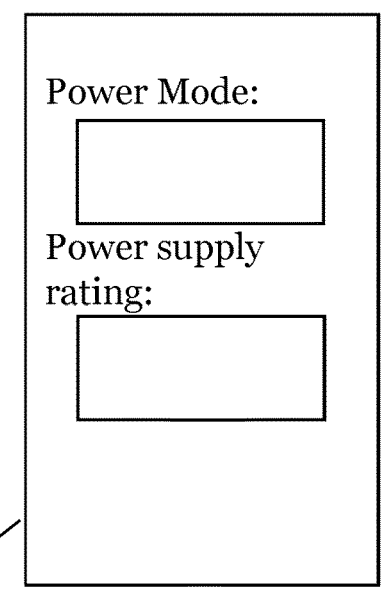

FIG. 8 shows a user interface, indicated generally by the reference numeral 70', in accordance with an example embodiment. The user interface 70' shows an example display in highly schematic form that enables a user to provide information (such as information relating to the power capabilities of the power supply) to the charging controller 14 or the control module 17. Thus, the user interface 70' enables a user to input power mode information (e.g. which power modes should be enabled) or power supply ratings (e.g. the current capability of the power supply). The power capabilities information provided using the user interface 70' may be in addition to, or instead of, the power capabilities information obtained using the algorithm 50 described above.

Of course, the user interfaces 70 and 70' are provided by way of example only and are highly schematic. Many alternative display configuration could be provided, including displaying other forms of data. For example, information such as one or more of battery capacity, maximum charging current or maximum charging voltage for a battery (such as the battery 16 described above) may be input via the user interface; this might be particularly useful, for example, if the battery was a replaceable battery (such that those details may change).

Figure 9:
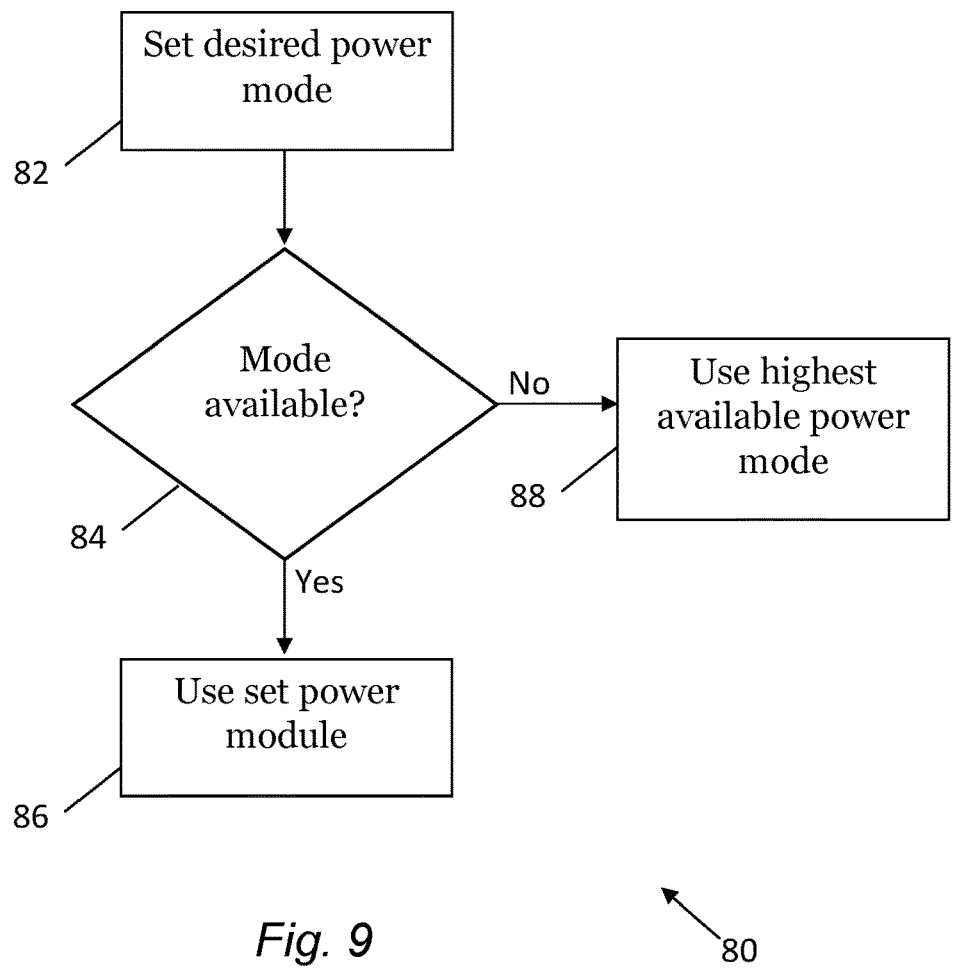
FIG. 9 is a flow chart showing an algorithm in accordance with an example embodiment.

FIG. 9 is a flow chart showing an algorithm, indicated generally by the reference numeral 80, in accordance with an example embodiment.

The algorithm 80 starts at operation 82, where a desired charging mode is set (for example by the control module 17 or the charging controller 14). The charging mode may be set based on information such as the current charge level of the battery and a usage profile of the aerosol generating device (e.g. recent usage and/or anticipated future usage). Other data may also be used, for example time of day and the charging profile of the user of the aerosol generating device.

At operation 84, a determination is made regarding whether the desired charging mode is available. Whether or not the charging mode is available may, for example, be based on the outputs of the algorithm 50 described.

If the desired charging mode is available, then the algorithm moves to operation 86, where that charging mode is used. Alternatively, if the desired charging mode is unavailable (e.g. due to the power supply capabilities), then the algorithm moves to operation 88, where the highest available power mode is used.

The algorithm 80 is provided by way of example only; many modifications and alternatives will be apparent to the person skilled in the art.

Figure 10:
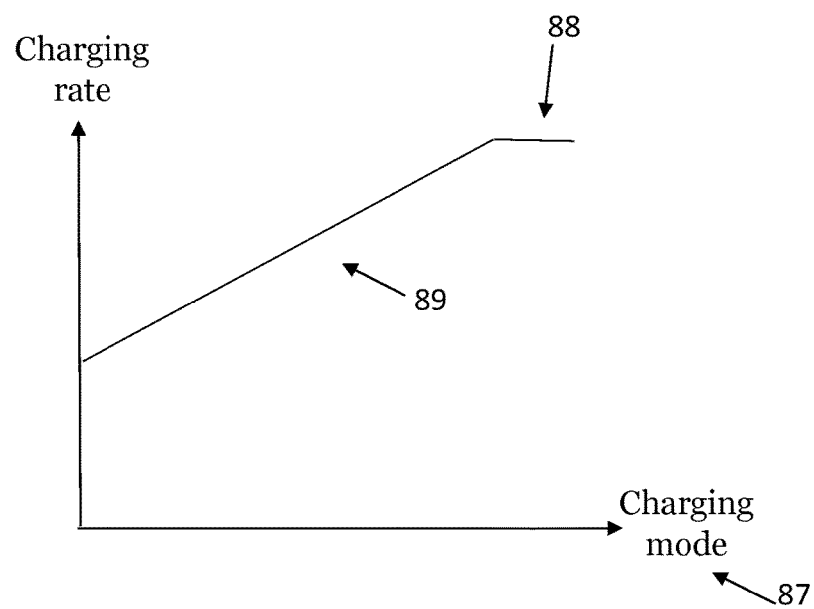
FIG. 10 is a plot demonstrating a use of an example embodiment.

FIG. 10 is a plot, indicated generally by the reference numeral 87, demonstrating a use of an example embodiment.

The plot 87 shows the charging rate changing as the charging mode changes. In a first charging mode, indicated generally by the reference numeral 88, the charging rate is relatively high (such that the battery 16 is charged at a first, relatively high, charging rate in the first charging mode). In other charging modes, indicated generally by the reference numeral 89, the charging rate is lower than the charging rate in the first charging mode. However, in the other charging modes 89, the charging rate varies smoothly, rather than in steps as discussed above with reference to the plot 30. Thus, the plot 87 shows charging rates of two possible charging modes that could be set in the operation 24 described above, wherein the charging rate is variable in the second charging mode.

In one example embodiment, the charging rate increases as the charging mode increases until the charging rate reaches a maximum rate set for the particular power source. That maximum rate may be set based on the determined power capabilities of the power source.

Figure 11:
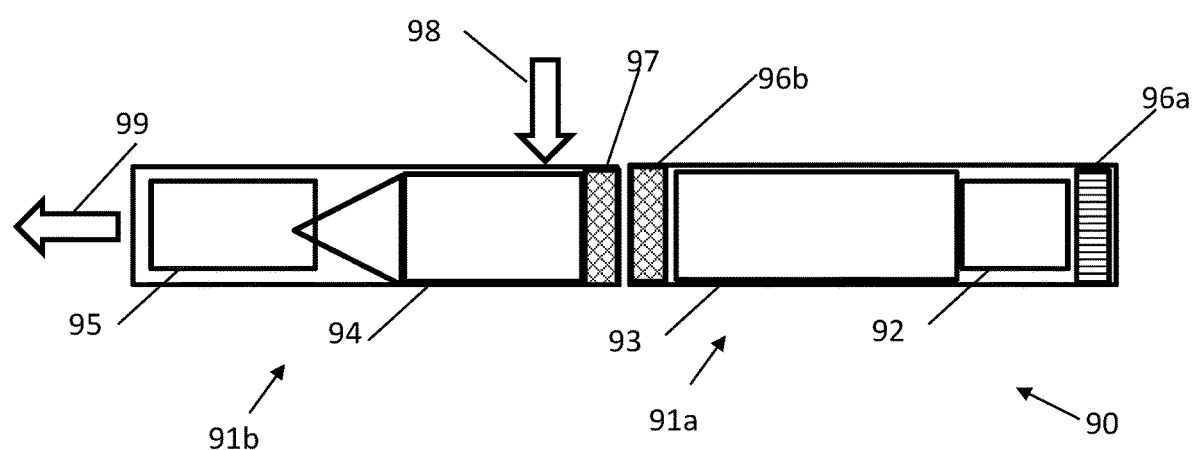
FIG. 11 is a block diagram of an aerosol provision device in accordance with an example embodiment.

FIG. 11 is a block diagram of an aerosol provision device, indicated generally by the reference numeral 90, in accordance with an example embodiment.

The aerosol provision device 90 is an example implementation of the aerosol generating device 12 or 12' described above. The device 90 is a modular device, comprising a first part 91a and a second part 91b.

The first part 91a of the device 90 includes a control circuit 92 (which may include the charging controller 14 and the control module 17 of the device 12) and a battery 93 (such as the battery 16 described above). The second part 91b of the device 90 includes a heater 94 and a liquid reservoir 95 (that may collectively form of the aerosol generator 15 of the system 10 described above).

The first part 91a includes a first connector 96a (such as a USB connector). The first connector 96a may enable connection to be made to a power source (such as the power source 18 described above) for charging the battery 93, for example under the control of the control circuit 92 (e.g. under the control of the charging controller 14).

The first part 91a also includes a second connector 96b that can be removably connected to a first connector 97 of the second part 91b.

In the use of the device 90, air is drawn into an air inlet of the heater 94, as indicated by the arrow 98. The heater is used to heat the air (e.g. under the control of the circuit 93). The heated air is directed to the liquid reservoir 95, where an aerosol is generated. The aerosol exits the device at an air outlet, as indicated by the arrow 99 (for example into the mouth of a user of the device 90).

Figure 12:
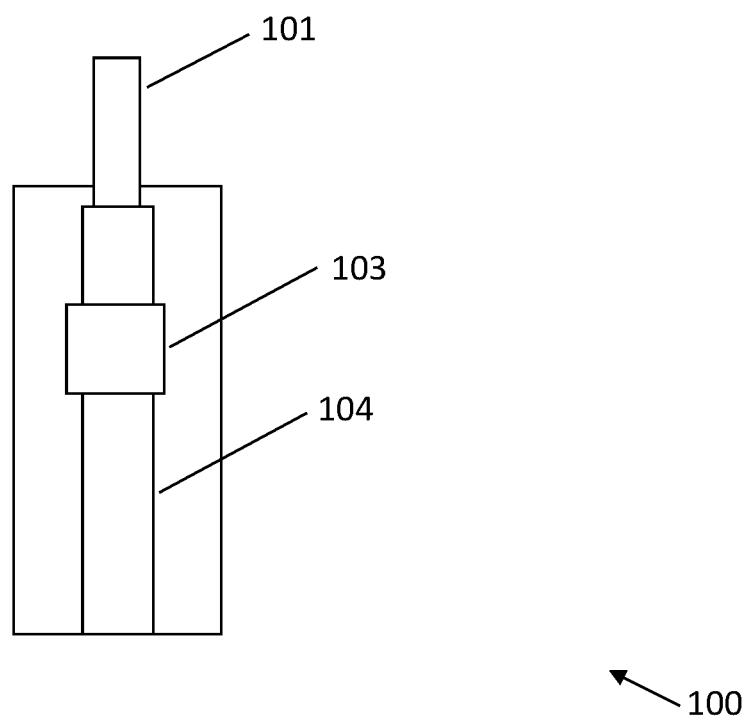
FIG. 12 is a block diagram of an aerosol provision device in accordance with an example embodiment.

FIG. 12 is a block diagram of an aerosol provision device, indicated generally by the reference numeral 100, in accordance with an example embodiment. The aerosol provision device 100 is an alternative example implementation of the aerosol generating device 12 or 12' described above and may also include other elements of the system 10.

FIG. 12 is a perspective view of the aerosol provision device 100 without an outer cover. The aerosol provision device 100 may comprise a replaceable article 101 that may be inserted in the aerosol provision device 100 to enable heating of the article 101. The aerosol provision device 100 further comprises one or more heating elements 103 and one or more air tube extenders 104.

The heating elements 103 may be heaters that directly heat the article 101. Alternatively, the heating elements 103 may be inductive heating elements that are configured to interact with a susceptor comprised within the article 101 (or provided elsewhere).

The two alternative aerosol provision devices 90 and 100 are provided by way of example only; many further variants and alternatives are possible.

Many variants to the embodiments described above are possible.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An apparatus for an aerosol generating device, the apparatus comprising:
   a charging controller configured to control charging of a battery using a power supply at a charging current dependent, at least in part, on power capabilities of the power supply,
   wherein the charging controller, or a control module in communication with the charging controller, is configured to determine the power capabilities of the power supply based on a voltage drop in response to a request for an increased charging current.

2. The apparatus as claimed in claim 1, wherein the charging controller is configured to select between at least a first charging mode and a second charging mode.

3. The apparatus as claimed in claim 2, wherein the first charging mode is a higher power charging mode and the second charging mode is a lower power charging mode.

4. The apparatus as claimed in claim 2, wherein a charging rate for charging the battery is higher in the first charging mode than in the second charging mode.

5. The apparatus as claimed in claim 1, further comprising a user interface that enables a user to provide information relating to the power capabilities of the power supply.

6. The apparatus as claimed in claim 1, further comprising the battery.

7. The apparatus as claimed in claim 1, further comprising an aerosol generator.

* * * * *